United States Patent
Ahn et al.

(10) Patent No.: US 10,827,447 B2
(45) Date of Patent: Nov. 3, 2020

(54) METHOD AND DEVICE FOR TRANSMITTING UPLINK

(71) Applicant: LG ELECTRONICS INC., Seoul (KR)

(72) Inventors: Joonkui Ahn, Seoul (KR); Kijun Kim, Seoul (KR); Jaehyung Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 12 days.

(21) Appl. No.: 16/318,124

(22) PCT Filed: Jul. 14, 2017

(86) PCT No.: PCT/KR2017/007587
§ 371 (c)(1),
(2) Date: Jan. 15, 2019

(87) PCT Pub. No.: WO2018/016807
PCT Pub. Date: Jan. 25, 2018

(65) Prior Publication Data
US 2019/0306816 A1    Oct. 3, 2019

Related U.S. Application Data

(60) Provisional application No. 62/365,387, filed on Jul. 22, 2016.

(51) Int. Cl.
*H04W 56/00*    (2009.01)
*H04L 5/00*    (2006.01)
(Continued)

(52) U.S. Cl.
CPC ......... *H04W 56/003* (2013.01); *H04L 5/0007* (2013.01); *H04L 27/26* (2013.01);
(Continued)

(58) Field of Classification Search
CPC ... H04W 56/003; H04W 56/00; H04W 72/12; H04W 56/001; H04W 72/0446;
(Continued)

(56) References Cited

U.S. PATENT DOCUMENTS

2010/0265904 A1    10/2010    Yang et al.
2013/0022090 A1    1/2013    Weng et al.
(Continued)

FOREIGN PATENT DOCUMENTS

CN    102415187    4/2012
CN    104604195    5/2015
(Continued)

OTHER PUBLICATIONS

PCT International Application No. PCT/KR2017/007587, International Search Report dated Oct. 23, 2017, 9 pages.
(Continued)

*Primary Examiner* — Pao Sinkantarakorn
*Assistant Examiner* — Kabir U Jahangir
(74) *Attorney, Agent, or Firm* — Lee, Hong, Degerman, Kang & Waimey

(57) ABSTRACT

Provided are a method and a device for transmitting an uplink in a wireless communication system. The device determines an uplink transmission group based on the difference between downlink reception timing and uplink transmission timing, and transmits an uplink signal according to the uplink transmission group which has been determined.

10 Claims, 6 Drawing Sheets

(51) Int. Cl.
*H04L 27/26* (2006.01)
*H04W 72/04* (2009.01)
*H04W 72/12* (2009.01)

(52) U.S. Cl.
CPC ......... *H04L 27/2607* (2013.01); *H04W 56/00* (2013.01); *H04W 56/001* (2013.01); *H04W 72/0446* (2013.01); *H04W 72/12* (2013.01)

(58) Field of Classification Search
CPC .. H04W 56/0005; H04L 27/26; H04L 5/0007; H04L 27/2607
See application file for complete search history.

(56) References Cited

U.S. PATENT DOCUMENTS

| | | | |
|---|---|---|---|
| 2015/0011215 A1 | 1/2015 | Uemura et al. | |
| 2015/0195077 A1* | 7/2015 | Kim | H04L 5/0048 370/329 |
| 2016/0100425 A1 | 4/2016 | Dinan | |
| 2016/0149743 A1 | 5/2016 | Rong et al. | |
| 2018/0242326 A1* | 8/2018 | Aiba | H04W 72/1284 |

FOREIGN PATENT DOCUMENTS

| | | |
|---|---|---|
| EP | 2852231 | 3/2015 |
| KR | 20130045169 | 5/2013 |
| WO | 2009072171 | 6/2009 |

OTHER PUBLICATIONS

European Patent Office Application Serial No. 17831280.7, Search Report dated Feb. 7, 2020, 5 pages.
ETSI MCC, "Draft Report of 3GPP TSG RAN WG2 Meeting #87bis," R2-144721, Nov. 2014, 124 pages.
The State Intellectual Property Office of the People's Republic of China Application Serial No. 201780044442.8, Office Action dated Aug. 7, 2020, 5 pages.

* cited by examiner

METHOD AND DEVICE FOR TRANSMITTING UPLINK

CROSS-REFERENCE TO RELATED APPLICATIONS

This application is the National Stage filing under 35 U.S.C. 371 of International Application No. PCT/KR2017/007587, filed on Jul. 14, 2017, which claims the benefit of U.S. Provisional Application No. 62/365,387, filed on Jul. 22, 2016, the contents of which are all hereby incorporated by reference herein in their entirety.

BACKGROUND OF THE INVENTION

Field of the Invention

The present invention relates to wireless communication, and more particularly, to a method for uplink transmission in a wireless communication system, and a device using the method.

Related Art

A next-generation wireless communication system is required to support various user environments and greater communication capacity. Representative issues considered in the next-generation system include a massive machine type communications (MTC) which provides various services anytime anywhere by connecting a plurality of devices, ultra-reliable and low-latency communications (URLLC) considering a service which is sensitive to reliability and latency, or the like.

It is considered to deploy a plurality of base stations in a narrow region in order to increase data transfer efficiency. In addition, since there is a need to support various applications, a specific device may attempt an access in wider coverage than coverage of the base station. Since this device may operate without transmission timing control, uplink transmission may act as serious interference to another device.

SUMMARY OF THE INVENTION

The present invention provides a method for uplink transmission and a device using the same.

In an aspect, a method for uplink transmission in a wireless communication system includes determining, by a wireless device, an uplink transmission group based on a difference between downlink reception timing and uplink transmission timing, transmitting, by the wireless device, an uplink signal in an asynchronized subframe or a synchronized subframe when the wireless device belongs to a first uplink transmission group, and transmitting, by the wireless device, the uplink signal only in the asynchronized subframe when the wireless device belongs to a second uplink transmission group. The synchronized subframe includes a plurality of first-orthogonal frequency division multiplexing (OFDM) symbols, the asynchronized subframe includes a plurality of second-OFDM symbols, and a cyclic prefix (CP) of a second-OFDM symbol is longer than a CP of a first-OFDM symbol.

In another aspect, a device for uplink transmission in a wireless communication system includes a transceiver configured to transmit and receive a radio signal, and a processor operatively coupled to the transceiver. The processor is configured to determine an uplink transmission group based on a difference between downlink reception timing and uplink transmission timing, transmit an uplink signal in an asynchronized subframe or a synchronized subframe when the wireless device belongs to a first uplink transmission group, and transmit the uplink signal only in the asynchronized subframe when the wireless device belongs to a second uplink transmission group. The synchronized subframe includes a plurality of first-orthogonal frequency division multiplexing (OFDM) symbols, the asynchronized subframe includes a plurality of second-OFDM symbols, and a cyclic prefix (CP) of a second-OFDM symbol is longer than a CP of a first OFDM symbol.

Interference caused by uplink transmission can be reduced between wireless devices having a variety of uplink transmission timing.

DESCRIPTION OF EXEMPLARY EMBODIMENTS

Figure 1:
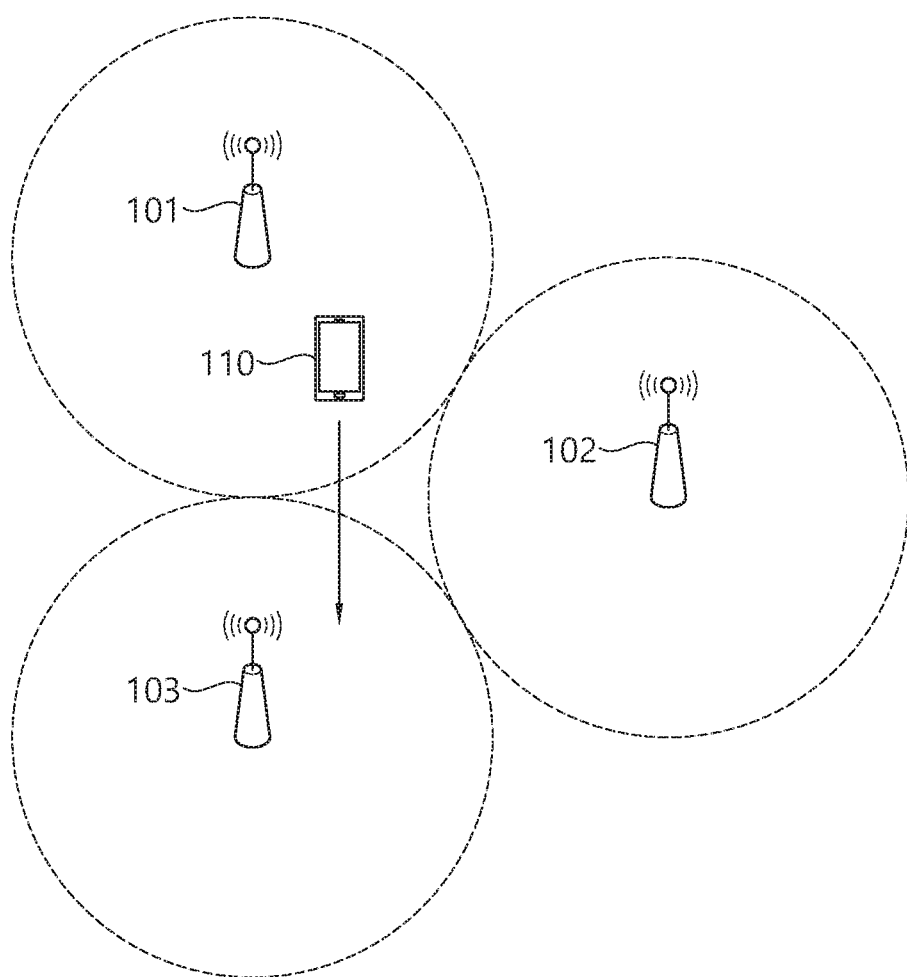
FIG. 1 shows a wireless communication system according to an embodiment of the present invention.

FIG. 1 shows a wireless communication system to which an embodiment of the present invention is applied.

A plurality of transmission/reception points (TRPs) 101, 102, and 103 are deployed. A wireless device 110 is provided with a data transmission/reception service from at least one of the plurality of TRPs 101, 102, and 103.

The wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. The wireless device may also be a device supporting only data communication such as a machine-type communication (MTC) device.

The TRP provides a data transmission/reception service for a wireless device in its coverage. The plurality of TRPs may be connected to the same base stations (BS) or different BSs. The TRP may be the BS itself, or may be a remote BS such as a relay. Alternatively, the TRP may be a sector/beam operated by the BS. The TRP may be a cell operated by the BS. Since the TRPs are densely deployed while covering a small region, overall data transmission/reception efficiency can be increased.

Hereinafter, it is described that the present invention is applied according to a $3^{rd}$ generation partnership project (3GPP) long term evolution (LTE)/LTE-advance (LTE-A) based on 3GPP technical specification (TS). However, this is for exemplary purposes only, and thus the present invention is also applicable to various wireless communication networks.

A subframe is a time unit for scheduling a downlink channel and an uplink channel. A subframe includes a plurality of orthogonal frequency division multiplexing (OFDM) symbols, and a time of transmitting one subframe is referred to as 1 transmission time interval (TTI). Although one subframe may include 14 OFDM symbols, this is for exemplary purposes only. The OFDM symbol is only for expressing one symbol period in a time domain, and there is no limitation in a multiple access scheme or terminologies. For example, the OFDM symbol may also be referred to as another terminology such as a single carrier-frequency division multiple access (SC-FDMA) symbol, a symbol period, etc.

Figure 2:
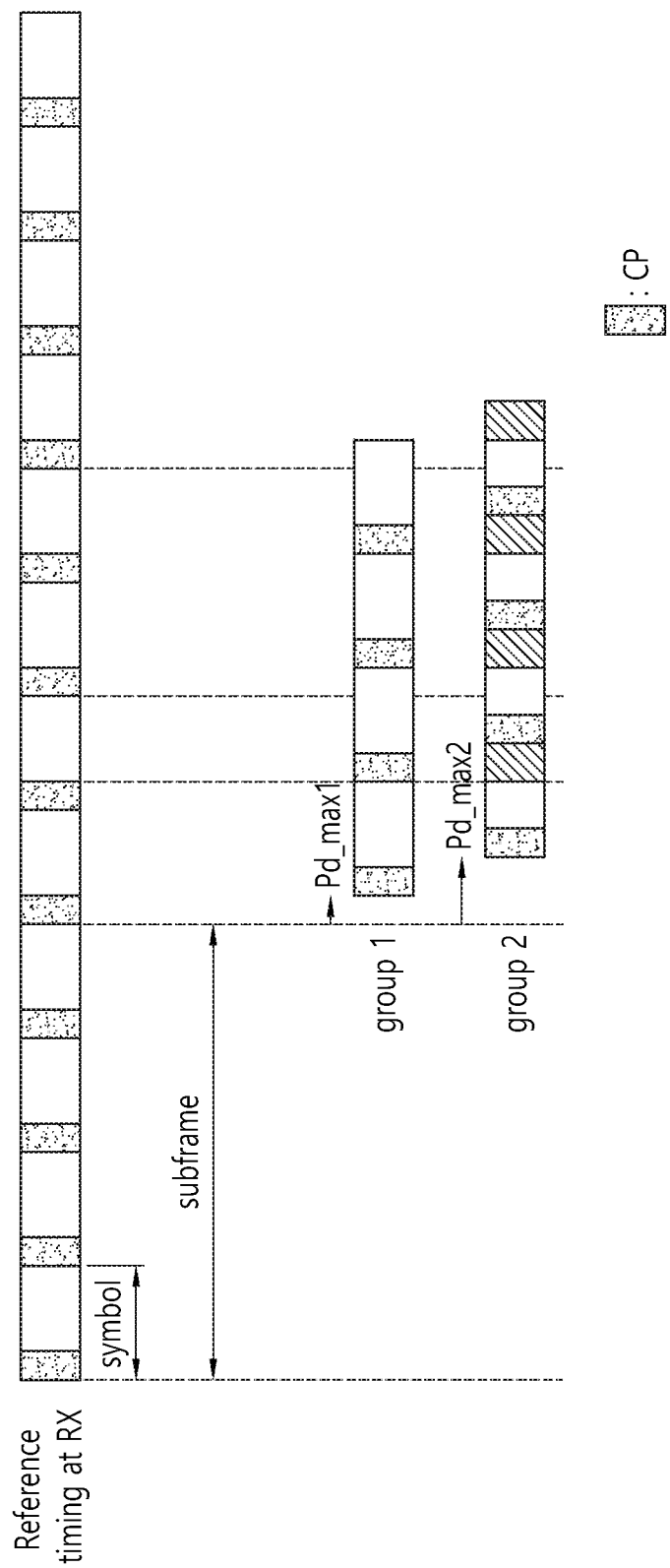
FIG. 2 shows an example of uplink (UL) transmission timing.

FIG. 2 shows an example of uplink transmission timing.

A subframe includes 4 OFDM symbols, but this is for exemplary purposes only. 1 OFDM symbol includes a cyclic prefix (CP) and a fast Fourier transform (FFT) window obtained by performing FFT.

Uplink (UL) transmission timing of a wireless device having access to each TRP is controlled to be received within a CP from a perspective of TRP reception. TRP coverage may be designed such that reception is achieved within a CP only with UL transmission timing based on downlink (DL) reception timing even if there is no special timing control. Therefore, UL transmissions of different wireless devices can maintain an orthogonal characteristic without being interfered from each other.

There is a case where the wireless device has to attempt an access to wider coverage than default TRP coverage or to operate without timing control. It is assumed that wireless devices which can perform reception within a CP belong to a group 1, and wireless devices which are possibly out of the CP belong to a group 2. It is also assumed that, from a TRP perspective, a maximum reception time difference between the wireless devices belonging to the group 1 is Pd_max1, and a maximum reception time difference between the wireless devices belonging to the group 2 is Pd_max2. If reception timing of a UL transmission signal caused by the wireless device belonging to the group 2 is out of the CP, the UL signal may act as great interference since orthogonality with signals transmitted by other wireless devices is not maintained. In FIG. 2, a slashed portion for group-2 transmission indicates interference acting on a reception signal of the group 1.

The wireless device may determine a UL transmission group according to a timing alignment command (TAC) thereof. The wireless device may determine the UL transmission group on the basis of a difference between DL reception timing and UL transmission timing. If the difference between the DL reception timing and the UL transmitting timing is greater than a specific value, it can be said the wireless device belongs to the group 2 which is possibly out of a CP. The specific value may be equal to a CP of a synchronized subframe described below. Alternatively, the specific value may be given by a base station.

The base station may report information regarding a UL transmission group to which the wireless device belongs. The base station may report whether the wireless device will belong to the group 1 or the group 2.

Figure 3:
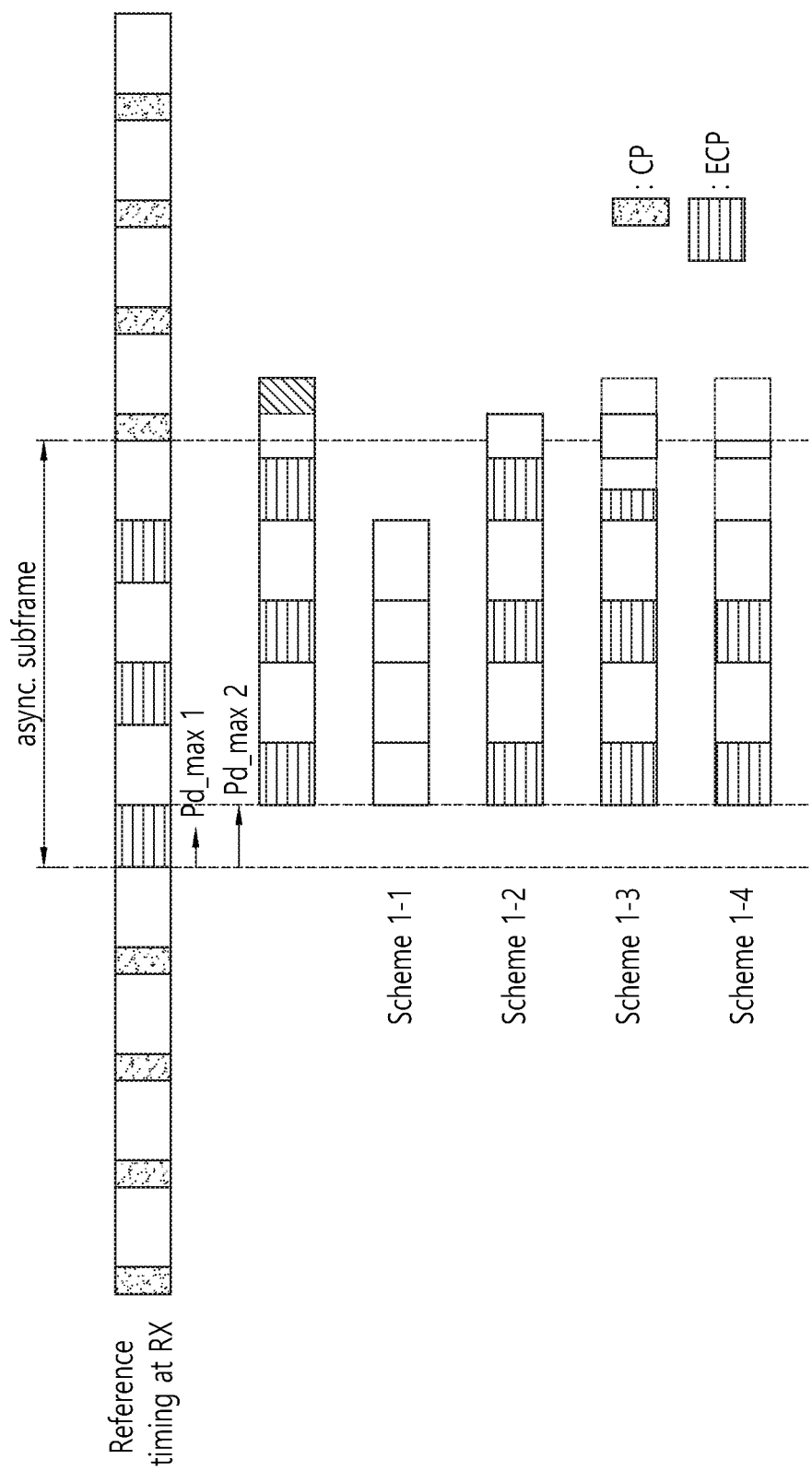
FIG. 3 shows UL transmission according to embodiments of the present invention.

FIG. 3 shows UL transmission according to embodiments of the present invention.

A subframe is divided into a synchronized subframe having a first CP length and an asynchronized subframe having a second CP length. The second CP length is longer than the first CP length, and is called an extended cyclic prefix (ECP).

A wireless device belonging to the first group transmits a UL signal in any of the synchronized subframe and the asynchronized subframe, whereas a wireless device belonging to the group 2 transmits a UL signal only in the asynchronized subframe. The wireless device belonging to the group 1 may also attempt transmission only in the asynchronized subframe in case of transmission in which uncertainty of reception timing is great according to a transmission type.

It is assumed that a subframe n−1 is a synchronized subframe, a subframe n is an asynchronized subframe, and a subframe n+1 is a synchronized subframe. If a first portion of the synchronized subframe n+1 subsequent to the asynchronized subframe n overlaps with a last portion of the asynchronized frame n, and if the overlapping portion is out of a first CP of the synchronized subframe n+1, it may act as interference. To prevent this, a first OFDM symbol of the synchronized subframe n+1 may be left empty without being used in UL transmission.

Earlier transmission timing than transmission in the synchronized subframe may be applied to transmission in the asynchronized subframe n, and a last OFDM symbol of the synchronized subframe n−1 prior to the asynchronized subframe may be left empty without being used in UL transmission.

Alternatively, an operation in the asynchronized subframe n may be limited as follows.

(Scheme 1-1) In an asynchronized subframe, at least one last OFDM symbol is not used in UL transmission. In an asynchronized subframe prior to a synchronized subframe, interference on the synchronized subframe can be avoided in such a manner that UL transmission is not expected in at least one last OFDM symbol. Alternatively, in all synchronized subframes, UL transmission may not be expected in at least one last OFDM symbol. A similar effective can be obtained in such a manner that earlier transmission timing than transmission in the synchronized subframe is set to transmission of the asynchronized subframe, and UL transmission in at least one first OFDM symbol is not expected in all asynchronized subframes or an asynchronized subframe immediately after the synchronized subframe.

(Scheme 1-2) In an asynchronized subframe, a last portion of a last OFDM symbol is not used in UL transmission. Interference on a synchronized subframe can be avoided in such a manner that a last portion of an asynchronized subframe which is out of a CP of a subsequent synchronized subframe is not used UL transmission. In case of SC-FDMA transmission, a similar effect can be obtained in such a manner that a last modulation symbol of a DFT precoding input of a last OFDM symbol is left empty.

(Scheme 1-3) In an asynchronized subframe, a portion of a last OFDM symbol is not used in UL transmission, and a CP corresponding to the unused portion is not used in transmission. In the scheme 1-2, although the portion of the last OFDM symbol is not used in transmission, since all CPs are used in UL transmission, a CP characteristic is lost and thus orthogonal transmission cannot be completely guaranteed. Interference on a synchronized subframe can be avoided in such a manner that a portion which is possibly out of a CP of a subsequent synchronized subframe is not used in a last OFDM symbol of an asynchronized subframe in UL transmission and a CP corresponding to the unused portion is not used in UL transmission. In case of SC-FDMA transmission, a similar effect can be obtained in such a manner that last modulation symbols of a DFT precoding input of a last OFDM symbol are left empty and cyclic copy of a time-domain signal subjected to IFFT is used again as a CP.

(Scheme 1-4) A CP and portion of a last OFDM symbol in an asynchronized subframe are not used in UL transmission. In the scheme 1-3, since a portion of a CP of an OFDM symbol is excluded in transmission or low transmit power is used, a transmit power change level of a device is great in one OFDM symbol, which may cause a difficulty in radio frequency (RF) implementation. Therefore, implementation complexity may be reduced in such a manner that the entire CP of the last OFDM symbol and the portion which is out of the synchronized subframe are not used in UL transmission. In particular, a length of an unused portion of the last OFDM symbol may be longer than a CP length of the synchronized subframe. The length of the unused portion of the last OFDM symbol may be equal to a value obtained by subtracting the CP length of the synchronized subframe from a maximum reception delay of the device. The length of the unused portion of the last OFDM symbol may be equal to a maximum reception delay length.

Figure 4:
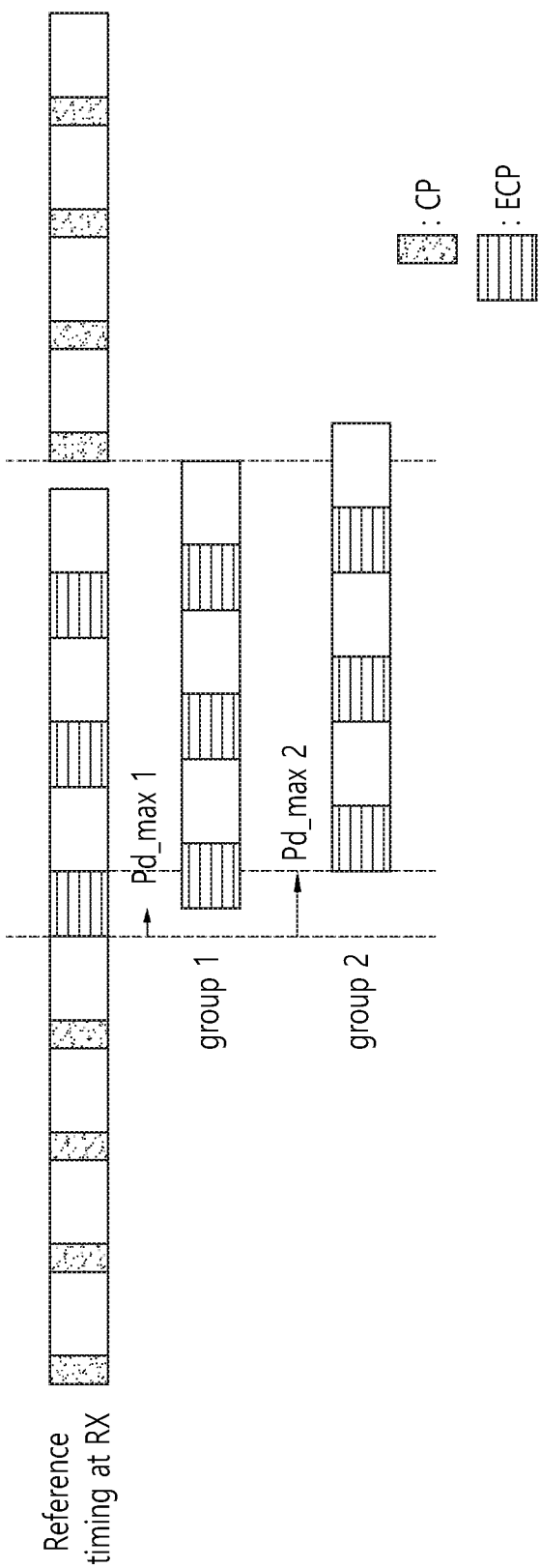
FIG. 4 shows UL transmission according to another embodiment of the present invention.

FIG. 4 shows UL transmission according to another embodiment of the present invention.

An asynchronized subframe may be configured to have a shorter length than a synchronized subframe. A guard time may be defined between the asynchronized subframe and a subsequent synchronized subframe. The guard time may be equal to a difference between a CP length of the asynchronized subframe and a CP length of the synchronized subframe, or may be defined based on the difference.

Figure 5:
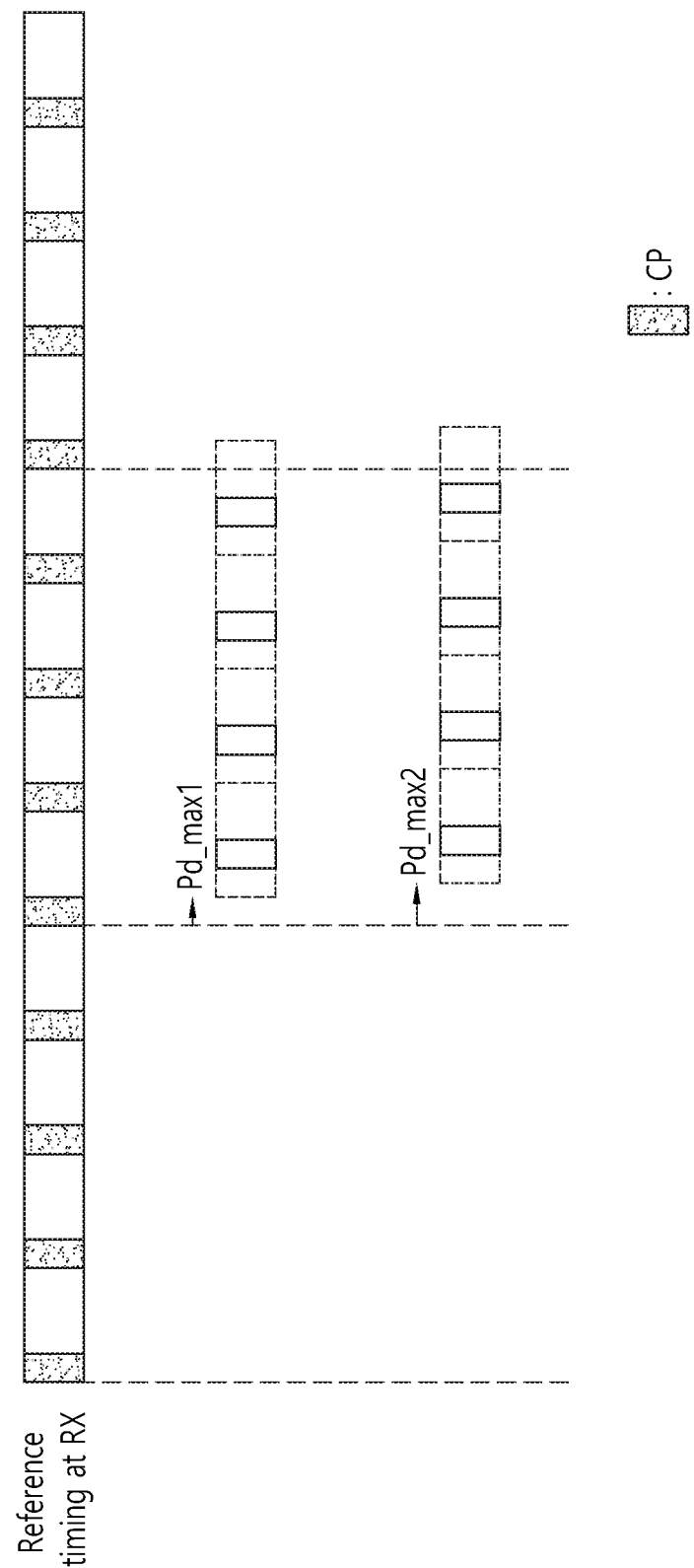
FIG. 5 shows UL transmission according to another embodiment of the present invention.

FIG. 5 shows UL transmission according to another embodiment of the present invention.

A wireless device belonging to a group 2 does not transmit a first portion and last portion including a CP in all OFDM symbols. A wireless device in which uncertainty of reception timing is great may use only a portion of an OFDM symbol in UL transmission in all OFDM symbols as in the scheme 1-4. A length of a last unused portion of each OFDM symbol may be longer than a CP length. The length of the last unused portion of each OFDM symbol may be equal to a value obtained by subtracting the CP length from a maximum reception delay of the device. The length of the last unused portion of each OFDM symbol may be equal to a maximum reception delay length.

A wireless device which attempts an initial access to a specific TRP or attempts an access switching (i.e., a handover) to a target TRP from a source TRP may use an asynchronized subframe in UL transmission as in the embodiment of FIG. 3. Alternatively, the wireless device may use a shortened OFDM symbol in UL transmission as in the embodiment of FIG. 5.

A wireless device which does not receive a TAC yet or which operates without the TAC may use an asynchronized subframe in UL transmission as in the embodiment of FIG. 3. Alternatively, the wireless device may use a shortened OFDM symbol in UL transmission as in the embodiment of FIG. 5.

Figure 6:
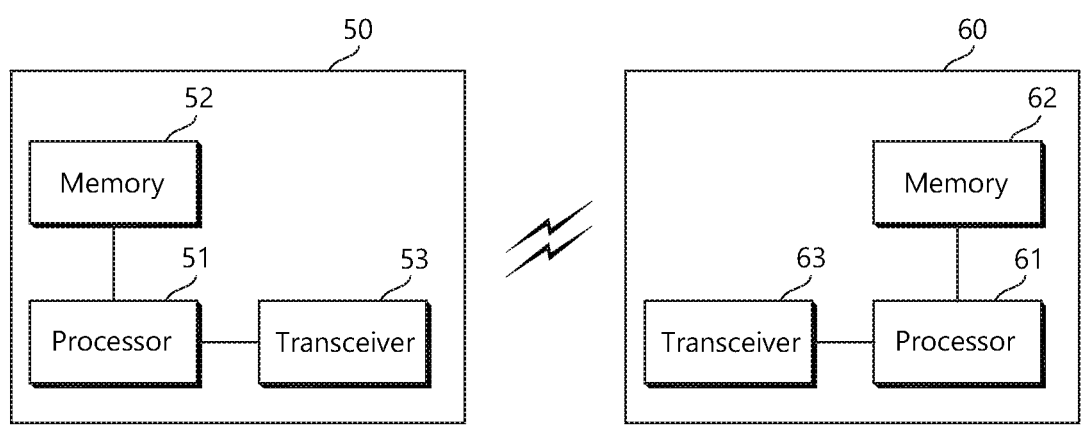
FIG. 6 is a block diagram showing a wireless communication system according to an embodiment of the present invention.

FIG. 6 is a block diagram showing a wireless communication system according to an embodiment of the present invention.

A wireless device 50 includes a processor 51, a memory 52, and a transceiver 53. The memory 52 is coupled to the processor 51, and stores various instructions executed by the processor 51. The transceiver 53 is coupled to the processor 51, and transmits and/or receives a radio signal. The processor 51 implements the proposed functions, procedures, and/or methods. In the aforementioned embodiment, an operation of the wireless device may be implemented by the processor 51. When the aforementioned embodiment is implemented with a software instruction, the instruction may be stored in the memory 52, and may be executed by the processor 51 to perform the aforementioned operation.

A BS 60 includes a processor 61, a memory 62, and a transceiver 63. The BS 60 may operate in an unlicensed band. The memory 62 is coupled to the processor 61, and stores various instructions executed by the processor 61. The transceiver 63 is coupled to the processor 61, and transmits and/or receives a radio signal. The processor 61 implements the proposed functions, procedures, and/or methods. In the aforementioned embodiment, an operation of a TRP may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The transceiver may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for uplink transmission in a wireless communication system, the method comprising:
   determining, by a wireless device, an uplink transmission group based on a difference between downlink reception timing and uplink transmission timing;
   transmitting, by the wireless device, an uplink signal in an asynchronized subframe or a synchronized subframe based on the wireless device belonging to a first uplink transmission group; and
   transmitting, by the wireless device, the uplink signal only in the asynchronized subframe based on the wireless device belonging to a second uplink transmission group,
   wherein the synchronized subframe includes a plurality of first-orthogonal frequency division multiplexing (OFDM) symbols, the asynchronized subframe includes a plurality of second-OFDM symbols, and a cyclic prefix (CP) of a second-OFDM symbol is longer than a CP of a first-OFDM symbol, and
   wherein, based on the difference between the downlink reception timing and the uplink transmission timing being greater than the CP of the first-OFDM symbol, the wireless device belongs to the second uplink transmission group.

2. The method of claim 1, wherein in a last second-OFDM symbol of the asynchronized subframe, an excess portion which is out of a CP of a first first-OFDM symbol of a synchronized subframe subsequent to the asynchronized subframe is not used in transmission of the uplink signal.

3. The method of claim 2, wherein a CP of the last second-OFDM symbol corresponding to the excess portion is not used in transmission of the uplink signal.

4. The method of claim 2, wherein a CP of the last second-OFDM symbol of the asynchronized subframe is not used in transmission of the uplink signal.

5. The method of claim 1, wherein a last second-OFDM symbol of the asynchronized subframe is not used in transmission of the uplink signal.

6. A device for uplink transmission in a wireless communication system, the device comprising:
a transceiver configured to transmit and receive a radio signal; and
a processor operatively coupled to the transceiver and configured to:
determine an uplink transmission group based on a difference between downlink reception timing and uplink transmission timing;
transmit an uplink signal in an asynchronized subframe or a synchronized subframe based on the wireless device belonging to a first uplink transmission group; and
transmit the uplink signal only in the asynchronized subframe based on the wireless device belonging to a second uplink transmission group,
wherein the synchronized subframe includes a plurality of first-orthogonal frequency division multiplexing (OFDM) symbols, the asynchronized subframe includes a plurality of second-OFDM symbols, and a cyclic prefix (CP) of a second-OFDM symbol is longer than a CP of a first-OFDM symbol, and
wherein, based on the difference between the downlink reception timing and the uplink transmission timing being greater than the CP of the first-OFDM symbol, the wireless device belongs to the second uplink transmission group.

7. The device of claim 6, wherein in a last second-OFDM symbol of the asynchronized subframe, an excess portion which is out of a CP of a first first-OFDM symbol of a synchronized subframe subsequent to the asynchronized subframe is not used in transmission of the uplink signal.

8. The device of claim 7, wherein a CP of the last second-OFDM symbol corresponding to the excess portion is not used in transmission of the uplink signal.

9. The device of claim 7, wherein a CP of the last second-OFDM symbol of the asynchronized subframe is not used in transmission of the uplink signal.

10. The device of claim 7, wherein a last second-OFDM symbol of the asynchronized subframe is not used in transmission of the uplink signal.

* * * * *